June 18, 1929.                L. F. DOUGLASS                1,718,037
         METHOD AND APPARATUS FOR PRODUCING NOVEL EFFECTS IN PHOTOGRAPHY
                           Filed May 21, 1928
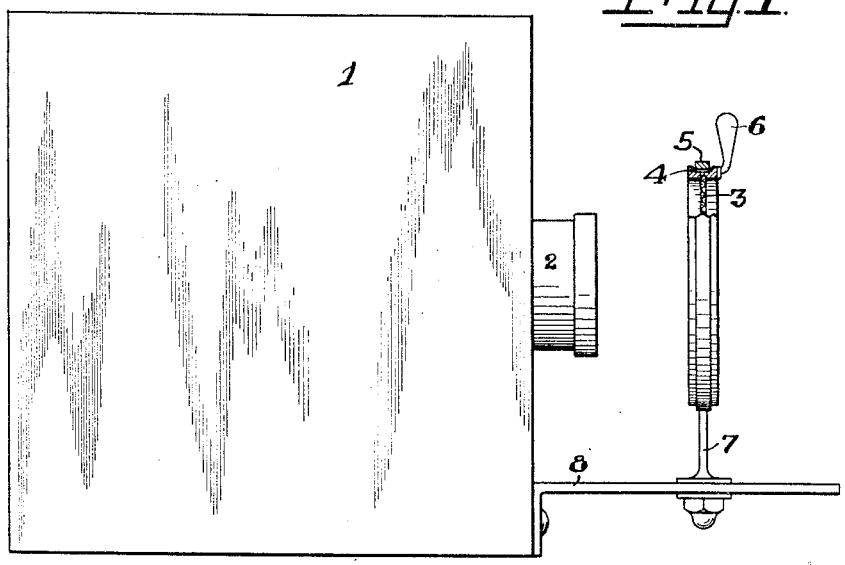
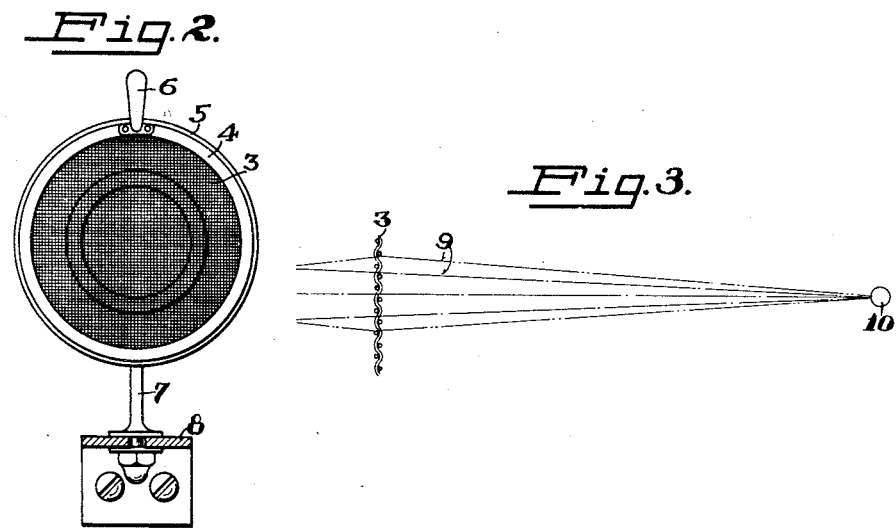
INVENTOR.
Leon F. Douglass
BY
J. E. Tralucce.
ATTORNEY.

Patented June 18, 1929.

1,718,037

UNITED STATES PATENT OFFICE.

LEON F. DOUGLASS, OF MENLO PARK, CALIFORNIA.

METHOD AND APPARATUS FOR PRODUCING NOVEL EFFECTS IN PHOTOGRAPHY.

Application filed May 21, 1928. Serial No. 279,319.

This invention relates to a novel method and improved apparatus for producing novel effects in photography, wherein is embodied means for diffusing the light rays proceeding from a suitable source such as the sun or an electric light bulb.

An object of my invention is to provide a novel method and improved apparatus for diffusing the light rays proceeding from a source of light to a photographic film, whereby an image having the appearance of a bright object with a number of less bright rays around the same may be produced on the film.

A further object of my invention is to provide apparatus of the class characterized which includes a wire mesh screen rotatably positioned between a source of light and a photographic film, which said screen is adapted to diffuse some of the light rays proceeding from the light to the film, thereby producing an image having the effect of a star or the like.

A still further object of my invention is to provide apparatus of the kind characterized which includes a wire mesh screen rotatably positioned between a source of light such as the sun and a photographic film, which said screen when rotated produces on the film the effect of a bright object having a number of streaks of light revolving around it.

In the accompanying drawings:

Fig. 1 is a side view of my improved apparatus for producing novel effects in photography, showing a part of the support for the wire mesh screen broken away;

Fig. 2 is a front view of the wire mesh screen and its support; and

Fig. 3 is a diagrammatic view showing the path the light rays assume in proceeding from a source of light through the wire mesh screen.

Referring to the drawings, the numeral 1 represents a camera of the usual construction, having therein a sensitized film or plate and means for exposing the latter. The camera is also provided in the usual manner with a lens tube 2, which retains a lens of the ordinary kind through which the light rays from an object proceed to the film.

Positioned in front of the lens tube and in the path of the light rays from an object to be photographed is a wire mesh screen 3 constructed preferably from thinly woven silvered, golden, brass or copper wire. The screen is held within a circular frame 4, which in turn is rotatably mounted in a circular support 5, the former being provided with a handle 6 which enables the revolving of the screen and frame inside the support. The support 5 is secured by a vertical bar 7 to an extension 8 attached to the camera casing.

As shown in Fig. 3, the light rays 9 from a source of light 10, which may be an electric light, the sun or any other object sending out bright rays of light, pass through the wire mesh screen 3 and are produced in the usual manner on the film located in the camera. The central rays proceed in a direct line through the openings between the wires forming the central part of the mesh screen, and because they are not reflected, produce a bright central image of the object 10 on the film. Others of the rays which are located to the sides of the central rays, strike the wires forming another portion of the mesh screen and are reflected thereby with comparatively less brightness onto the film at points around and adjacent the central image formed by the central and unintercepted rays.

The image produced on the film has the appearance of a bright object having a number of less bright streaks of light extending outwardly from the sides thereof. Thus the image produced may have the appearance of a star, or other similar object. By rotating the screen 3 while the film is being exposed the outer rays producing the less bright streaks of light may be made to revolve around the central image, thus producing novel effects of a single stationary object.

It is apparent to those skilled in the art that a number of objects may be photographed at one and the same time by means of the apparatus illustrated, thereby causing a number of images having effects similar to those described to be produced on a single film.

It is apparent to those skilled in the art that my improved apparatus may be constructed in other shapes and forms than the one illustrated and may be used for other purposes than the one described herein; so for this and other reasons I desire my invention included broadly within the appended claims.

Having described my invention, what I claim is:

1. A method of producing novel effects in photography which comprises positioning a wire mesh screen between a source of light rays and a photographic film, allowing some of the rays from the said source to proceed directly through the screen between the wires thereof onto the photographic film, reflecting others of the rays from the said source by means of some of the wires of the screen onto the film, and moving the screen on its axis in a circular direction to cause the reflected rays to assume other positions on the film.

2. In apparatus of the class described comprising in combination with a sensitized surface, of a wire mesh screen positioned in front of the sensitized surface and in the path of the light rays from a source of light, and means for moving the screen in a circular direction on its axis.

3. In apparatus of the class described comprising in combination with a camera lens, of a wire mesh screen positioned in front of the camera lens and in the path of the light rays from a source of light, which said screen is adapted to intercept and reflect some of said rays through the camera lens, and means for moving the screen on its axis in a circular direction, whereby the reflected rays may be directed in other directions through the camera lens.

LEON F. DOUGLASS.